Oct. 28, 1969  C. A. LITZLER  3,474,666
APPARATUS FOR TESTING TIRE AND INDUSTRIAL CORDS
Filed Sept. 3, 1968  4 Sheets-Sheet 1

INVENTOR
CYRIL A. LITZLER
BY Bosworth, Sessions,
Herrstrom & Cain
ATTORNEYS.

INVENTOR.
CYRIL A. LITZLER
BY Bosworth, Sessions, Herrstrom & Cain
ATTORNEYS

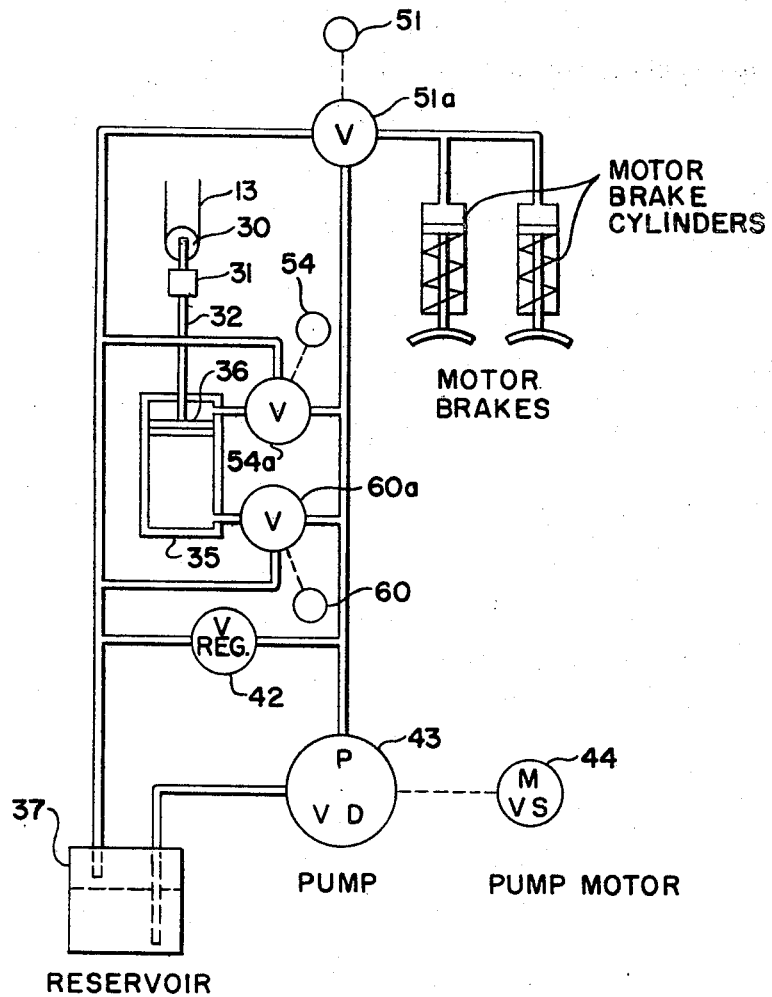

United States Patent Office 3,474,666
Patented Oct. 28, 1969

3,474,666
APPARATUS FOR TESTING TIRE AND INDUSTRIAL CORDS
Cyril A. Litzler, 239 Brookpark Road,
Cleveland, Ohio 44109
Continuation-in-part of application Ser. No. 568,440, July 28, 1966. This application Sept. 9, 1968, Ser. No. 758,549
Int. Cl. G01n 3/28
U.S. Cl. 73—95.5         14 Claims

ABSTRACT OF THE DISCLOSURE

A method and apparatus for testing nondestructively a continuously supplied length of monofilament or multifilament material to determine and record its stress/strain characteristic and/or hysteresis loop at space intervals and also to measure and record on a continuous basis variations in tension or stretch under preset conditions. The material is wrapped around a multiwrap holdback capstan and a multiwrap takeup capstan and a dancer-mounted tension pulley is provided to receive and convey a loop of the material between the capstans. Clamps are used to stop the capstans while gripping the material for static stress/strain testing and the speed differential between the capstans is measured as well as the tension in the loop during dynamic testing.

CROSS REFERENCE TO RELATED APPLICATION

This application is a continuation-in-part of my copending U.S. patent application Ser. No. 568,440, filed July 28, 1966.

BACKGROUND OF THE INVENTION

The present invention relates to the physical testing of continuous lengths of filamentary material such as textile cords and other fibrous strands, or any other type of material in either strand or monofilament form. More particularly the invention relates to a method and apparatus for continuously and nondestructively testing a continuous length of such material to determine its stress/strain characteristic as well as variations in tension or stretch under certain fixed conditions.

For the purpose of this specification the expression "stress/strain characteristic" will be used to indicate the curve generated by comparing the increase in tensile stress or tension on the horizontal axis with the corresponding increase in elongation or stretch on the vertical axis. The expression "modulus of stretch" will be used to indicate the percent of permanent elongation or stretch in a length of filamentary material under a fixed tensile load. It will be assumed that the modulus of stretch measurement applies to elongation which occurs above the proportional limit of the material.

Physical testing of textile cords is particularly essential in many industrial processes in order to control the quality of the material and to develop cords and cord treating techniques which will provide optimum physical properties for the particular industrial application. A specific example is the textile cord used in the manufacture of pneumatic tires and other mechanical rubber goods; nylon, rayon, wire cords and glass being the best known. While some elasticity in these cords is acceptable and in some cases desirable, extensibility or permanent elongation is not and must be kept to a minimum. Accordingly these cords are normally hot-stretched or otherwise treated before they are embedded in uncured rubber by a calendering operation to provide the ply stock used in forming a tire carcass.

A typical tire cord or tire fabric treating method and apparatus is shown in my earlier U.S. Patents Nos. 2,952,078 and 2,955,342. Equipment of this type is intended to substantially reduce the natural extensibility or permanent elongation of the material by prestretching at high ambient temperatures. A low extensibility is particularly essential in the case of cords used in the plies of pneumatic tires in order to maintain the desired tire configuration when the tire is inflated and experiencing normal operational loads.

Tire and other similar reinforcing cords are also generally dipped in a suitable liquid adhesive and subsequently dried prior to fabrication of the tire carcass plies in order to assure proper adhesion between the cords and the rubber after the tire or end product is vulcanized. Normally the application of the adhesive is accomplished with the cords under tension to assure uniform application, all of these operations normally being performed in one continuous process.

It will be apparent, therefore, that a number of variable conditions exist during the dipping and hot-stretching or similar treatment of the cords, all of which affect the resulting physical characteristics of the material. Accordingly, it is essential that means be provided for testing the treated cord to assure that it meets minimum quality requirements and also for the purpose of adjusting the variable conditions in the treating process such as time intervals, temperatures, tension, twist, dip-pickup, changes in length and others, in order to obtain optimum or at least improved results. In the case of relatively non-extensible materials as multi- or monofilament cords of steel or glass, it may be likewise necessary to measure the suitability of these materials for rubber uses under the same conditions as the relatively extensible fibrous mono- or multifilament material.

Methods and equipment for accomplishing the physical testing of the cord generally embody destructive tests on treated samples to measure and record the stress/strain characteristics. Such equipment is typified by the "Scott" and "Instron" tensile testing machines. This type of testing is time consuming and cumbersome and does not give continuous information as to the condition of the cord. The need for continuous information is particularly vital in experimental work where performance tests such as for example on experimental tires must be correlated with the physical characteristics of a particular section of tire cord.

While some nondestructive testing methods of the continuous type have been developed, these generally measure only the permanent elongation under a fixed load or in terms more familiar to the art, the "modulus of stretch." Other such tests measure only the tension in pounds which is produced when the cord is stretched a fixed amount. This is normally accomplished by subjecting the moving cord to a fixed stretching force as it moves linearly through a testing station and then determining the elongation which occurs as a result of the tensioning. The permanent elongation which occurs results from a tensile stress in excess of the proportional limit of the material and should be distinguished from elastic stretching which occurs within the elastic limits of the material.

Continuous measurement of the percentage of permanent elongation may be accomplished for example by passing a continuous cord or strand to be tested between pulleys or capstans, tensioning the cord between them and then sensing the rotary speed differential. An apparatus for accomplishing this type of testing is shown in U.S. Patent No. 3,169,297 to Strandburg. While the "modulus of stretch" is an important characteristic of the cord it cannot be used for accurately predicting the stress/strain characteristic which is generally a separate independent property. Therefore, most experimental work requires separate static tests of the destructive type to determine the stress/strain characteristic even though the modulus of stretch be measured and recorded continuously after the treatment of the cord. No equipment or methods have yet been developed, however, to accomplish both types of tests on a single strand or cord on a continuous basis.

The device of the present invention satisfies the above long-felt need and affords other advantages not obtainable from the prior art.

SUMMARY OF THE INVENTION

According to my invention there is provided an apparatus for testing nondestructively a continuously supplied length of monofilament or multifilament material to determine its stress/strain characteristic at uniformly spaced time intervals and also for measuring and recording on a continuous basis variations in tension or stretch under preset conditions. The apparatus comprises a holdback capstan and a takeup capstan, the material being wrapped around each capstan several turns to prevent slipping. Operating in connection with the capstans is a dancer-mounted tension pulley adapted to receive and convey a loop of the material formed between the capstans. The capstans are driven by variable speed motors which enable the takeup capstan to be operated at a higher rotational speed than the holdback capstan in order to stretch the material in the loop. The permanent elongation of the material at a constant tension is measured continuously by sensing the speed differential between the capstans. Alternatively the tension in the material at a constant elongation is measured continuously by means of a load cell associated with the tension pulley.

For determining the stress/strain characteristic of the material, clamps are provided for stopping the capstans and for holding them against rotary movement at uniformly spaced time intervals. The clamps also engage the cord at the ends of the loop to prevent slippage. While the capstans are clamped, an inlet accumulator stores the continuously fed material until the capstans are released after which the capstans operate at a higher speed until the slack material stored in the accumulator is taken up. While the capstans are clamped the tension pulley is operated by a retracting means to stretch the loop to an elongation which is below the ultimate strength of the material. Accordingly there is no rupture of the material at any time. During the stretching, the elongation and tensile stress are measured and recorded on an X-Y recorder to provide a visual indication of the stress/strain characteristic of the material being tested. Alternatively a complete hysteresis loop can be obtained by recording throughout a complete stretch-relax cycle.

The apparatus repeats its two testing cycles continuously and records the test results concurrently on a visual recording device such as a strip chart potentiometer.

According to one embodiment of the invention, the retraction means for moving the tension pulley is a hydraulic cylinder operated by a variable pressure and variable displacement pump. However an alternative means in the form of a retraction screw driven by a direct current variable speed motor may be used as well.

According to a more limited aspect of the invention the measurements resulting from the modulus of stretch test cycle are recorded on a two-pen potentiometer strip chart recorder wherein variations in tension and elongation are recorded simultaneously.

According to the method of the invention a continuously supplied length of monofilament or multifilament material is tested according to the steps of forming a loop of the material between a holdback means and a takeup means, tensioning the loop to stretch the material, translating the material linearly through the loop while operating the takeup means at a faster speed than the holdback means while maintaining either a constant tension or a constant elongation, measuring and recording the tension and variations thereof (where elongation is constant) or the elongation and variations thereof (where tension is constant) by sensing the speed differential between the takeup means and the holdback means, at uniformly spaced time intervals, clamping the holdback and takeup means and the ends of the loop, nondestructively stretching the loop while the ends are clamped, and measuring and recording the stress/strain characteristic of the material during the stretching.

The method and apparatus thus described accomplish periodic measuring and recording of the stress/strain characteristic and a continuous measuring and recording of tension or elongation under preset conditions. This is done without interrupting the continuous input of material to the machine and without rupturing the cord at any point.

The invention has particular utility in connection with hot-stretching and dipping equipment for textile cords used in the fabrication of pneumatic tires and other mechanical rubber goods. The testing unit can be positioned either between the various stations of the treating apparatus or at the output end thereof where it may be used to determine almost immediately the effect of adjustments made in the variable conditions which are present in the treating process.

In a more specific application the apparatus of the invention may be positioned between the treating equipment and a special ply stock buildup drum for experimental tires. In this instance a very accurate record of the physical characteristics of the cord is made available to correlate performance and failure of the experimental tire with the precise physical characteristics of the cord at the point of failure.

It is among the objects of the invention to continuously and nondestructively test an endless length of filamentary material for stress/strain characteristic and for variations in tension or elongation under preset conditions, without removing test specimens from the endless strand.

Another object is to provide a means for measuring various physical characteristics of an endless length of filamentary material after it is passed through treating equipment, in order to provide a visual indication which may be used to adjust the variable treating conditions within the treating equipment to obtain desired or optimum results.

A further object is to provide a means for measuring and recording continuously the stress/strain characteristic and "modulus of stretch" of an endless length of tire cord which is subsequently used in the fabrication of the carcass plies of an experimental pneumatic tire, the tire being subsequently tested and the test results correlated with the continuous record.

Other objects, uses and advantages of the invention will become apparent from the following detailed description and drawings which illustrate a preferred embodiment of the invention for the purpose of illustration.

BRIEF DESCRIPTION OF THE DRAWINGS

FIGURE 5 is a schematic diagram of a hydraulic operating system for the testing unit of FIGURES 1 and 2.

DESCRIPTION OF THE PREFERRED EMBODIMENT

Figures 1, 2:
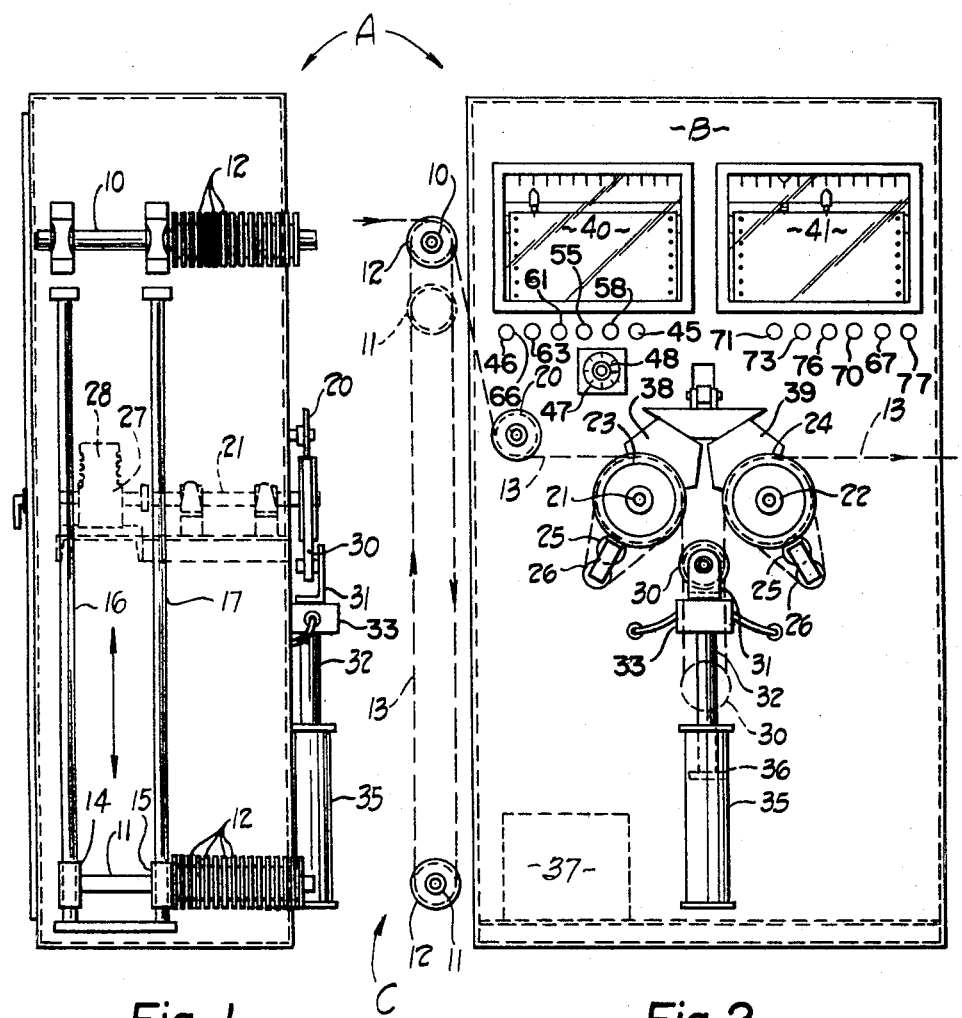
FIGURE 1 is a side elevational view of a testing unit embodying the invention.
FIGURE 2 is a front elevational view of the testing unit of FIGURE 1.

Referring more particularly to the drawings there is shown in FIGURES 1 and 2 a cord testing unit A embodying the invention. The unit A comprises a cabinet B formed of sheet metal or other suitable material.

Located at the left-hand or input side of the unit is an inlet accumulator C which includes two pulleys 10 and 11 each having a plurality of sheaves 12. The cord 13 is fed into the upper pulley 10 at the first sheave at the left-hand end as viewed in FIGURE 1. The cord 13 is then passed back and forth between the successive sheaves 12 of each pulley 10 and 11 until it reaches the right-hand sheave of the upper pulley 10 from where it is fed into the testing section. The lower pulley 11 is carried on a pair of upright sleeves 14 and 15 which are slidably mounted on vertical guide rods 16 and 17. The lower pulley 11 is normally positioned at its uppermost position shown in dashed lines in FIGURE 2 but is slidable downwardly to the position shown in FIGURE 1 to provide for storage of a sufficient quantity of cord 13 to permit the testing assembly to be stopped for a time interval sufficient to complete the static test for the stress/strain characteristic. This interval is normally around 30 seconds and the storage capacity will depend on the line speed of the cord.

When the endless length of cord leaves the inlet accumulator C it is guided to the test section by a pulley 20 extending outwardly from the front face of the cabinet B. Secured to drive shafts 21 and 22 journaled within the cabinet B are a holdback capstan 23 and a takeup capstan 24, the capstans 23 and 24 being mounted at the front of the cabinet B on the outwardly extending ends of the shafts 21 and 22. The capstans 23 and 24 are the multiwrap type with fleeter capstan spacing rolls 25 and 26 operatively associated therewith for proper cord alignment. The capstans are chrome plated to provide as smooth a surface as possible and to limit abrasion of the cord.

The shafts 21 and 22 are the output shafts of motorized gear reducer units 27 mounted inside the cabinet B, each unit 27 being driven by a ¾ horsepower direct current motor 28 having its own solid state full wave rectification unit with AC input. The cord 13 passes around each capstan 23 and 24 several turns and forms a loop 29 between the capstans 23 and 24, which is tensioned by a movable tension pulley 30.

The tension pulley 30 is mounted on a bracket 31 connected to a piston rod 32. Operatively associated with the tension pulley 30 is a load cell 33 which senses the force applied to the cord by the tension pulley 30 and thus measures the tensile stress or tension in the cord 13 passing through the loop 29. The load cell 33 is in the form of a high sensitive strain gauge such as the gauge identified by the trade designation "U3G2" (0–200 lbs.), manufactured by the Baldwin-Lima-Hamilton Corporation of Philadelphia, Pa.

The tension pulley 30 is operated by a hydraulic retraction cylinder 35 to provide a precision dancer-type loading system which applies a tensile load to the loop 29 for the static testing portion of the cycle. The hydraulic cylinder 35 has a piston 36 which operates through about a 12" stroke. Included in the hydraulic system are an oil reservoir 37, a pressure regulator 42, a variable displacement pump 43 and motor unit 44 (FIGURE 5), all located within the cabinet B. The variable displacement pump 43 allows for control of the rate of load application while the pressure regulator 42 allows for control of the load applied to the cord.

Located adjacent the capstans 23 and 24 are toggle clamps 38 and 39 adapted to stop the capstans at spaced time intervals and to clamp the cord at the ends of the loop 29 during static testing. The clamps 38 and 39 are operated pneumatically or by any other suitable method. From the takeup capstan 24 the endless cord 13 passes to a windup mechanism or in a typical test situation to an experimental tire buildup drum.

Figure 3:
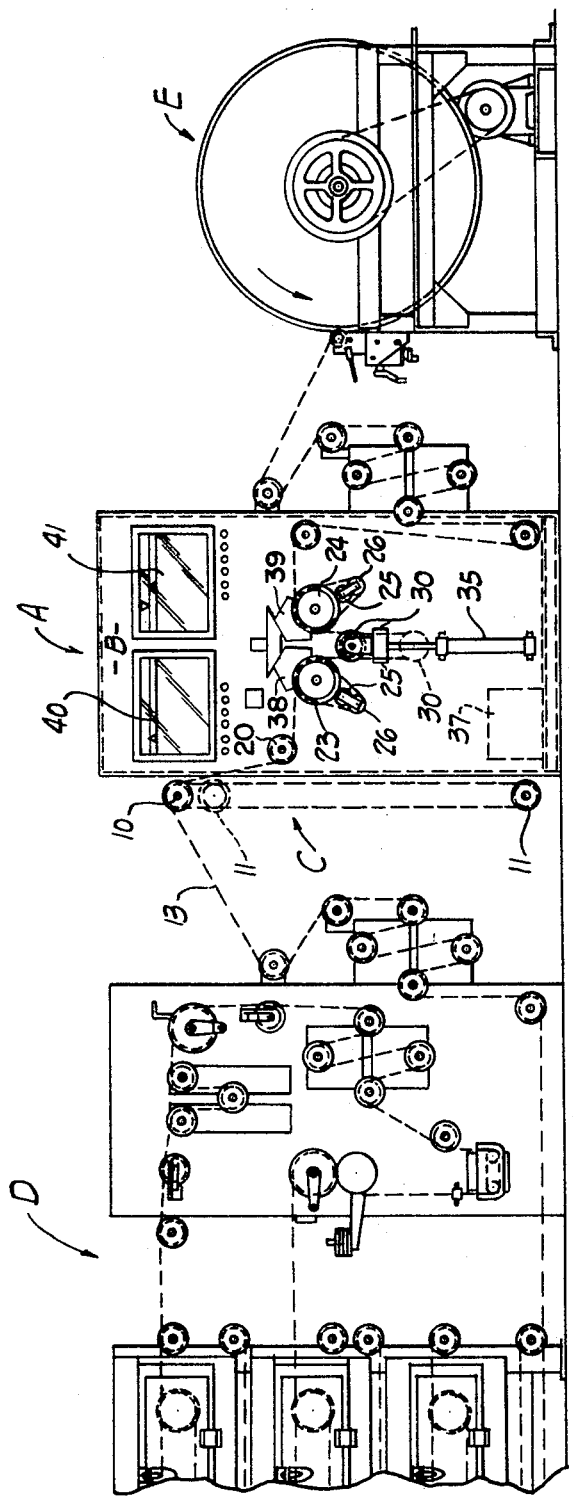
FIGURE 3 is an elevational view showing the testing unit of FIGURES 1 and 2 used in connection with equipment for hot-stretching and dipping tire cord, and a ply stock buildup drum for use in making cord reinforced plies for fabricating an experimental pneumatic tire.

FIGURE 3 shows a typical installation of the test unit A in connection with a tire cord hot-stretching and dip apparatus D used in the treatment of tire cord to be used in the fabrication of an experimental tire. The treated and tested cord is delivered to an experimental tire buildup drum E which is used in the preparation of the carcass plies.

In this particular instance the plies are fabricated by first applying a layer of uncured ply stock rubber on the drum, wrapping the treated and tested cord around the drum beginning at one end and extending in a helical path of travel to the other end. A second layer of uncured ply stock is then applied over the cords to complete one ply. Additional layers of cord reinforced plies can be superposed as required. The fabricated ply material is then slit axially along the drum and the resulting sheet removed.

The recording of the test measurements made by the unit A is provided for by means of two recording units. On the left hand side of the unit A as viewed in FIGURE 2 is an X—Y axis type reversing recorder 40 to be used for the static test and which records on a moving strip chart the stress/strain characteristic measured by each static test cycle. On the right-hand side is a two-pen analog recorder 41 also adapted to record continuously on a moving strip chart.

Figure 4:
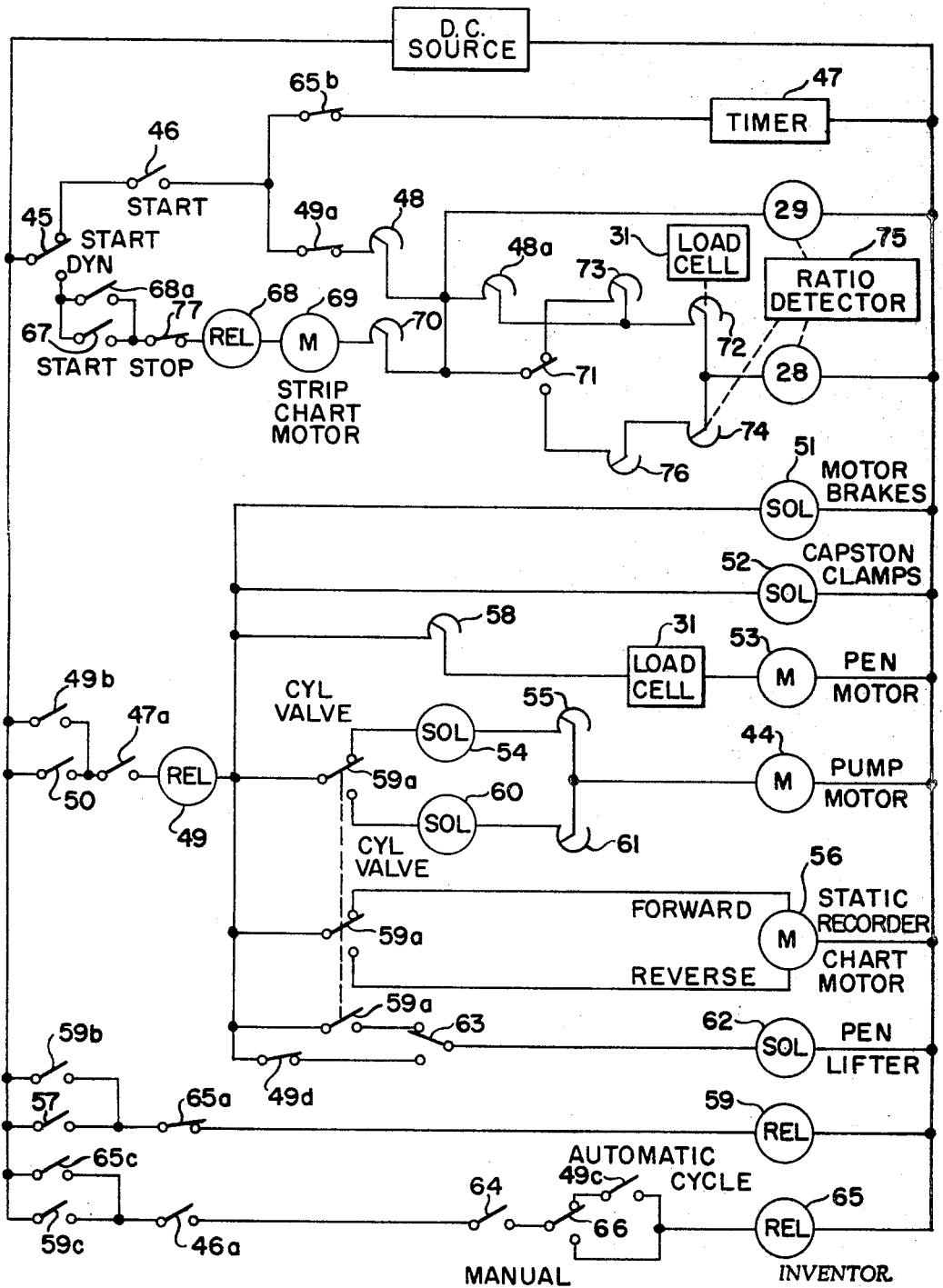
FIGURE 4 is a schematic diagram of an electrical control circuit for the testing unit of FIGURES 1 and 2.

FIGURE 4 shows a control system for the testing unit in diagrammatic form. The mode of operation (dynamic or static) is selected by means of a two-position selector switch 45 located on the control panel, the switch 45 being shown in the "static" position. The static test control circuit is energized by a push-pull type start switch 46 also located on the control panel. The switch 46 energizes an adjustable timer 47 and the capstan motors 28 and 29 which cause the cord to translate at a predetermined speed and under a predetermined tension. The speed is preset using the speed control potentiometer 48 and the tension is preset using a tension control potentiometer 48a. The timer 47 times out and closes contacts 47a which energize a relay 49. Another pair of contacts 50, however, hold the circuit to the relay 49 open whenever the accumulator C is not empty so that a static test cannot start until the capstan motors 28 and 29 have run long enough to translate through the test unit, all the cord stored in the accumulator C.

The relay 49 opens switch contacts 49a to stop the capstan motors 28 and 29 and at the same time the circuits to the static test operating elements are closed. Thus the solenoid 51 is energized to actuate the valve 51a for the capstan motor brakes, the air valve solenoid 52 is energized to actuate the air operated toggle clamps 38 and 39, the pen motor 53 is energized, the hydraulic pump 44 is energized and solenoid 54 is energized to open the hydraulic valve 54a for the down movement of the piston 36 in the hydraulic cylinder 35. The speed of the motor 44 during the movement is controlled using the down-rate potentiometer 55 located on the control panel. Also the recorder chart motor 56 is energized to run in the forward direction.

The relay 49 closes the holding switch contacts 49b which are in parallel with the accumulator-up contacts 50 to hold the relay circuit closed when the accumulator limit switch contacts 50 open as the accumulator C begins to store the incoming cord 13 during the static testing. The relay 49 also closes a pair of contacts 49c in the up limit switch circuit which will be described below, and open a pair of contacts 49d in the pen lifter solenoid circuit.

High tension limit switch contacts 57 are closed by the recorder 40 whenever a present maximum tension is reached in the cord. The tension limit is set using the high tension set potentiometer 58 located on the control panel. The contacts 57 energize a relay 59 which closes contacts 59a. These contacts simultaneously deenergize the solenoid 54, energize the solenoid 60 to open the hydraulic valve 60a to begin up movement of the piston 36, the speed of the motor 44 during the up movement being controlled by an up rate potentiometer 61 located on the control panel. The relay 59 also causes the control chart motor 56 to reverse and energize the pen lifter solenoid 62 if a "normal/hysteresis" selector switch 63 is in the normal position. The normal/hysteresis selector switch 63 determines whether the pen will be lifted after recording a stress/strain curve or after completing an hysteresis loop which is the closed curve recorded throughout the complete stretch-relax cycle of the static test.

The relay 59 also closes holding contacts 59b so that the relay 59 will remain energized until the piston 36 completes its up movement even though the high tension limit switch contacts 57 open. At the same time the relay 59 closes switch contacts 59c to arm the up limit switch circuit.

When the piston 36 completes its up movement it closes up limit switch contacts 64 to energize relay 65. The relay 65 opens contacts 65 to deenergize the relay 59, opens switch contacts 65b to deenergize the timer 62 and closes holding contacts 65c to keep the relay 65 energized after the contacts 59c open. With timer 62 deenergized, timer contacts 47a open to deenergize the relay 49, deenergize solenoids 51, 52, 60 and 62 as well as the motors 44, 53 and 56. With relay 49 deenergized, contacts 49a close and the motors 28 and 29 start up again and run at their preset speed and provide the preset tension in the cord as it translates through the testing unit.

A "manual/automatic cycle" selector switch 66 in the circuit for the relay 65 is used to select an automatic mode of operation whereby the static test is repeated after another timer interval, or a manual mode of operation wherein the motors 28 and 29 continue to operate but wherein the test will not be repeated until an operator recycles the start button 46.

As shown in FIGURE 4, when the selector switch 66 is in its automatic position the relay 65 will be deenergized whenever the relay 49 is deenergized or in other words almost immediately after relay 65 is energized. This closes relay contacts 65 and restarts the timer 47 which begins timing out another cycle.

When the selector switch 66 is in its manual position, relay 65 will remain energized until the start button 46 is pulled out to open contacts 46a and deenergize the relay 65 preparatory to starting another test cycle.

When the selector switch 45 is in its "dynamic" position, the unit may be started using the starting button switch 67 which energizes holding relay 68 to close holding contacts 68a, starts the two-pen strip-chart recorder motor 69, and starts the capstan motors 28 which operate to provide a speed of translation for the cord 13 as determined by a speed setting potentiometer 70 located on the control panel. The speed of rotation of the holdback capstan motor 28 will be less than the speed of the takeup capstan motor 29 to provide for the stretching and tensioning of the cord 13 as it translates through the loop.

The speed of the holdback capstan motor 28 is controlled by one of the two control circuits depending on the position of a "stretch/tension" selector switch 71 which is shown in its "tension" position in FIGURE 4. In this circuit condition the voltage to the motor 28 is controlled by a tension control potentiometer 72 operated by the load cell function. Thus the motor increases its speed slightly in response to an increase in tension so that a fairly uniform tension is maintained at all times even though the amount of stretch varies. The amount of tension to be maintained is controlled by a tension potentiometer 73 located on the control panel, which varies the voltage supplied to the potentiometer 72.

When the selector switch 71 is in its "stretch" position the voltage to the motor 28 is controlled by a potentiometer 74 operated in response to a speed ratio detector 75 which monitors the stretch of the cord translating through the loop. Accordingly the speed of rotation of the motor 28 will decrease slightly whenever there is a decrease in the amount of stretch as detected by the ratio detector 75. The amount of stretch to be maintained is controlled by a stretch-set potentiometer 76 located on the control panel, which varies the voltage supplied to the potentiometer 74.

The dynamic test operation may be stopped by pressing the "stop" button 77 which opens the circuit and deenergizes the holding relay 68 so that the unit cannot be started again until the "start" button 67 is actuated.

OPERATION

For the dynamic testing mode of operation an operator sets the "dynamic/static" selector switch 45 to the "dynamic" position and the "stretch/tension" selector switch 71 to the "stretch" or "tension" position depending on whether the strand is to translate between the capstans 23 and 24 under a uniform stretch or a uniform tension condition.

With the "stretch/tension" selector switch 71 set in the "stretch" position, the holdback capstan drive motor 28 is controlled by the trimming vernier potentiometer 74 so that the ratio of the holdback capstan speed to the takeup capstan speed is maintained at a uniform level. The holdback capstan motor 28 in effect as a brake or as a generator since it resists rotation of the holdback capstan in response to the pulling force exerted by the cord 13. During operation in this uniform stretch condition the tension in the loop is measured by the load cell 31 and transferred into a mechanical function which operates the tension pen of the two pen static test recorder 41. The amount of stretch is manually set by the operator using the stretch set potentiometer 76 which varies the voltage across the trimming vernier potentiometer 74.

When the stretch/tension selector switch 71 is in the "tension" position the load cell signal modulates the speed of the takeup capstan motor 28 which is controlled by the tension reference potentiometer 72 so that a constant tension is maintained. The variation in stretch is detected by a variation in the speed ratio between the holdback capstan motor 28 and the takeup capstan motor 29. The stretch is recorded by one pen of the two-pen strip-chart recorder 41. The amount of tension to be maintained is manually set by the operator using a tension-set potentiometer 73 which varies the voltage supplied to the potentiometer 72 operated in response to the load cell function.

The operation is initiated by pressing the start button 67 to energize the relay 68.

The static testing mode of operation can either be controlled manually by the operator as the strand is being translated through the tester or automatically repeated at spaced intervals by the timer 47. The manual or automatic static test mode operation is selected using the manual/automatic rotary selector switch 66 which also serves to operate the push button switches 46 and 46a to initiate the static testing.

Prior to starting a static test cycle the operator selects the down rate for the piston 36 using the down rate set potentiometer 55. This controls the speed of the pump motor 44 during the downward movement of the piston 36. The up rate is selected using the up rate potentiometer 61 which controls the speed of the pump motor 44 during the upward movement of the piston 36. Also the high tension limit is set using the tension set potentiometer 58 which varies the voltage to the pen drive motor 53 so that a predetermined tension will actuate the high tension limit switch 65a on the recorder.

The static testing is initiated by pressing the rotary push button 46 which starts the capstan motors 28 and 29 which run on tension control at a preset low tension and preset speed of 40 yards per minute. This also starts the timer 47 which times out in 15 seconds. After 15 seconds the contacts 47a will close and the circuits to the static test operating units will be energized, unless the accumulator C is not empty in which case the circuit will not be closed until the accumulator is empty to close the contacts 50.

The relay contacts 49a stop the capstan drive motors 28 and 29. At the same time solenoid valve 51 is energized to set the capstan motor brakes, solenoid 52 operates an air valve to set the cord clamps 38 and 39, solenoid 54 actuates a hydraulic valve to admit hydraulic fluid to the cylinder to start the down movement of the piston 36, the pump motor 44 starts, the recorder chart drive motor 56 starts, the pen drive motor 53 starts, and the pen lifter solenoid 65 is deenergized.

When the pen movement of the recorder 40 actuates the high tension limit switch contacts 57 the circuit to the down hydraulic cylinder valve solenoid is deenergized. At the same time and in response to the actuation of the switch contacts 57 the up hydraulic solenoid valve 60 is energized to start the up movement of the piston 36 and the static recorder strip chart motor reverses.

When the piston 36 completes its up movement it actuates a limit switch 64 which deenergizes the timer 47 and thus places all the solenoids and motors in their original condition. The up limit switch 64 also reactivates the timer 47 to start the timing for the start of the next cycle when the selector switch 66 is in the automatic position. The pen lifter solenoid 62 may be energized either at the completion of the stretch stroke or at the completion of the up stroke depending on whether the operator has set the pen selector switch 63 in the normal position (stretch/tension) or the hysteresis position.

It will be understood that my invention has been shown and described with reference to a preferred embodiment thereof which is intended for the purpose of illustration rather than limitation and other variations and modifications which will be apparent to those skilled in the art within the intended spirit and scope of my teaching, wherefor I do not want my patent to be limited to the form or forms of method and apparatus herein as specifically illustrated and described nor in any other manner inconsistent with the progress by which the art has been promoted by my invention.

I claim:

1. Apparatus for testing a continuously supplied length of filamentary material comprising means forming a loop of said material through which the material may be conveyed, said means including a hold-back element at the input end of said loop and a takeup element at the output end of said loop, means for operating said takeup element at a greater cord conveying speed than said holdback element to stretch said material in said loop; means responsive to the speed differential between said elements for measuring and recording the elongation of the material in said loop; means for measuring and recording the tension in the material which passes through said loop; clamp means cooperable with said holdback and takeup elements to hold the ends of said loop stationary; means for stretching said loop while the ends thereof are held, means for measuring and recording the stress in said loop during said stretching movement and means responsive to the movement of said stretching means for simultaneously measuring and recording the strain in said loop whereby the stress/strain characteristic of said material is indicated by said static stretching.

2. Apparatus as defined in claim 1 wherein said operating means drives said holdback element and said takeup element with a positive uniform speed differential to provide a constant stretch.

3. Apparatus as defined in claim 1 wherein said operating means drives said holdback element and said takeup element in response to said tension measuring means to provide a constant tension.

4. Apparatus as defined in claim 1 wherein said stretching means has a stretching movement of uniform speed and a return movement of uniform speed and wherein means responsive to said stretching movement and to said return movement is provided for determining and recording the hysteresis loop of said material indicated by said static stretching and relaxing.

5. Apparatus as defined in claim 1 wherein said means for stretching said loop while the ends thereof are held comprises a pulley through which said loop passes, a fluid cylinder, a piston mounted for reciprocating movement in said cylinder, said pulley being operatively connected to said piston, fluid pressure means for operating said piston in said cylinder and a pressure regulator for controlling the force exerted on said piston.

6. Apparatus as defined in claim 5 wherein said fluid pressure means includes manually adjustable fluid pump speed regulating means for controlling the thrust movement and return movement of said piston in said cylinder.

7. Apparatus as defined in claim 5 wherein said pressure regulator functions in response to the tension in said loop to maintain a manually controlled uniform fluid pressure in said cylinder whereby said piston maintains a uniform tension in said loop.

8. Apparatus as defined in claim 1 wherein said means for stretching said loop while the ends thereof are held comprises a pulley through which said loop passes, a threaded retraction member, a reciprocable member threadedly received for axial movement relative to said retraction member, said pulley being operatively connected to said reciprocable member, means for applying a torque to said retraction member and means for controlling the torque exerted by said torque applying means.

9. The testing apparatus of claim 1 in combination with apparatus for continuously treating filamentary material under varying conditions of tension and temperature, said testing apparatus being arranged to receive filamentary material treated by said treating apparatus.

10. The testing apparatus of claim 1 in combination with a ply buildup drum for fabricating cord reinforced carcass plies for an experimental pneumatic tire, said testing apparatus being arranged to test the tire cord material immediately before it is wound on said drum.

11. Apparatus for testing nondestructively a continuously supplied length of filamentary material for stress/strain characteristic and for variations in elongation under tensile load, comprising means forming a loop of said material through which the material may be conveyed, said means including a holdback element at the input end of said loop, a takeup element at the output end of said loop; means for operating said takeup element at a greater cord conveying speed than said holdback element to stretch said material in said loop; means responsive to the speed differential between said elements for measuring and recording the elongation of the material which passes through said loop; means for measuring and recording variations in tension in the material which passes through said loop; means cooperable with said holdback and takeup elements to hold the ends of said loop stationary; accumulator means for storing said continuously fed material upstream of said loop while said element are stopped; means for stretching said loop while the ends thereof are held, means for measuring and recording the stress in said loop during said stretching movement and means responsive to the movement of said stretching means for simultaneously measuring and recording the strain in said loop whereby the stress/strain characteristic of said material is indicated by said static stretching.

12. Apparatus as defined in claim 11 wherein said elements are capstans and wherein said means for operating said elements comprises an electric motor for each capstan, said motor being adapted to turn said capstans at a peripheral speed greater than the input line speed of said material after each time said stopping means is released until the storage capacity of said accumulator means has been removed.

13. Apparatus as defined in claim 12 wherein said means for operating said takeup element at a greater cord conveying speed than said holdback element comprises a trimming vernier potentiometer.

14. Apparatus for testing nondestructively a continuously supplied length of filamentary material for stress/strain characteristic and for variations in elongation under tensile load, comprising a holdback capstan and a takeup capstan, said capstans adapted to convey said material, a reciprocable tension pulley adapted to receive a loop of said material between said capstans, means biasing said pulley to provide a predetermined tension in said loop, means for operating said capstans whereby said takeup capstan turns at a higher rotational speed than said holdback capstan to stretch said material in said loop, means responsive to the rotary speed differential between said capstans for measuring and recording the elongation of said material as it passes between said capstans, means associated with said tension pulley for measuring variations in tension in said material as it passes between said capstans, clamps operable at spaced intervals to hold said capstans against rotary movement and to hold the ends of said loop against slip, accumulator means for storing said continuously fed material forwardly of said holdback capstans while said capstans are clamped, means for moving said tension pulley while said capstans are clamped to stretch said material, means for measuring and recording the stress in said loop during said stretching and means responsive to the movement of said tension pulley for simultaneously measuring and recording the strain in said loop whereby the stress/strain characteristic of the portion of the material so stretched is indicated.

References Cited

UNITED STATES PATENTS 1,941,917   1/1934   Schultz _____ 73—95.5

FOREIGN PATENTS 841,255   7/1960   Great Britain.

RICHARD C. QUEISSER, Primary Examiner

JOHN R. FLANAGAN, Assistant Examiner